Dec. 2, 1924.  
W. F. HINKLE  
MIXING VALVE  
Filed July 3, 1922  
1,517,990  
3 Sheets-Sheet 3
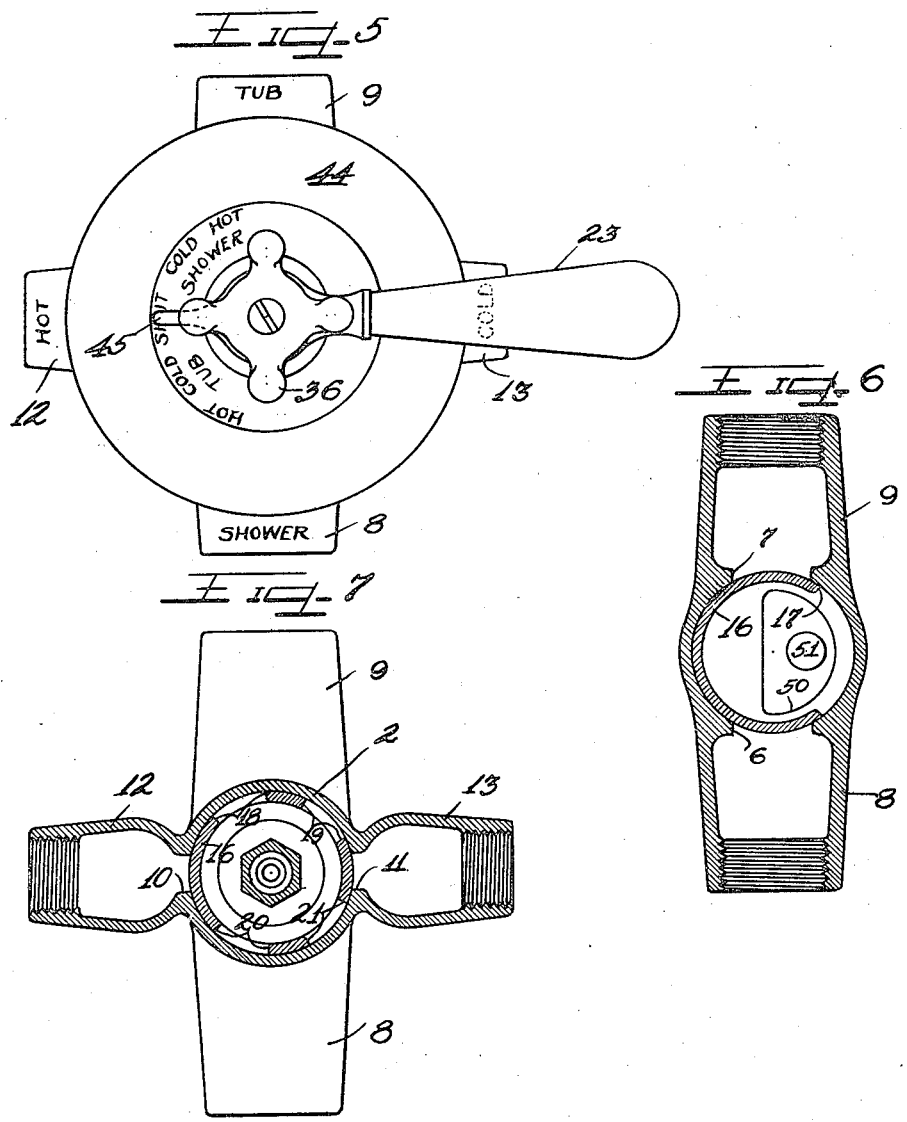
Witnesses  
Inventor  
WALTER F. HINKLE  
by ___ Atty.

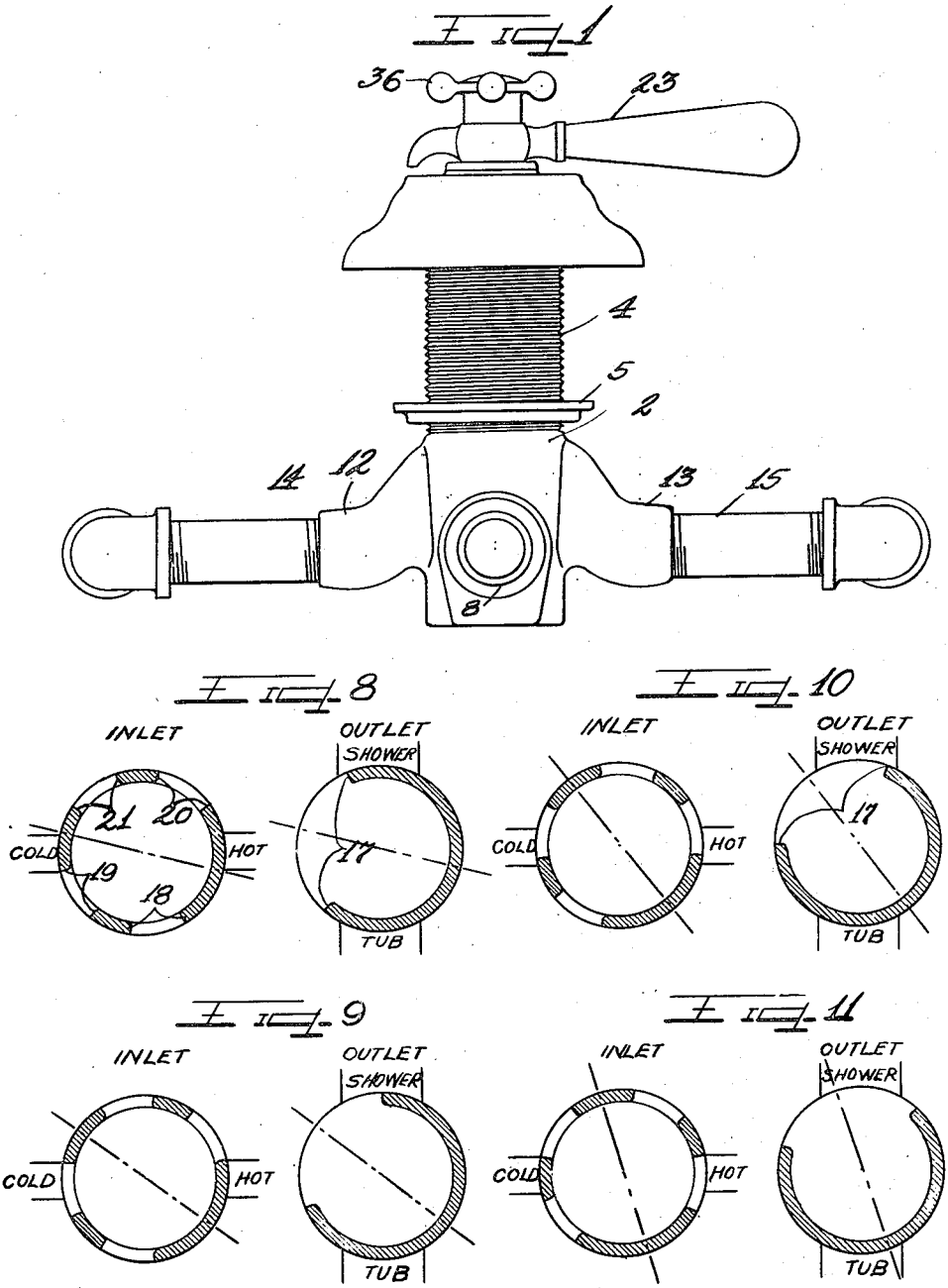

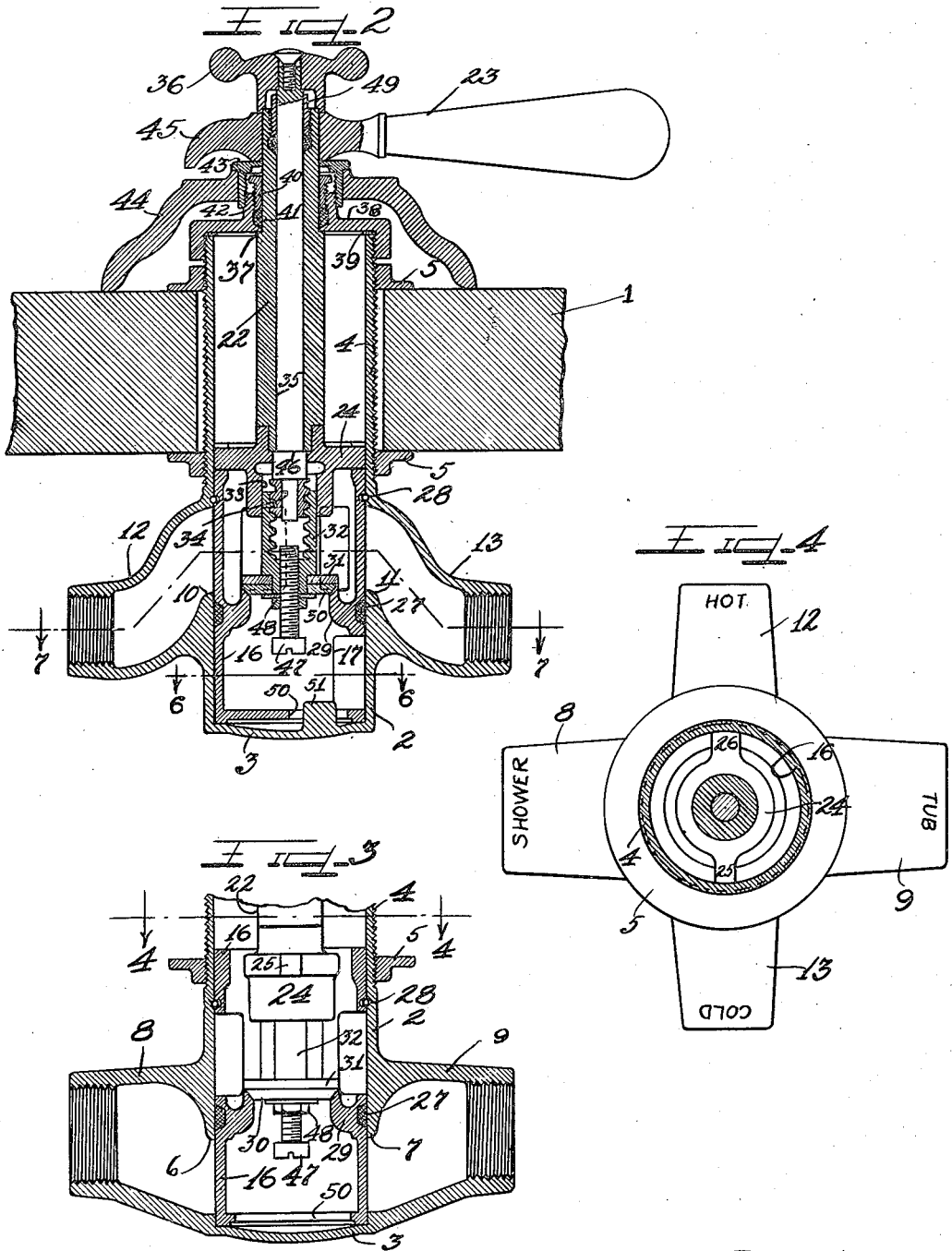

Patented Dec. 2, 1924.

1,517,990

UNITED STATES PATENT OFFICE.

WALTER F. HINKLE, OF CHICAGO, ILLINOIS, ASSIGNOR TO BENEKE & KROPF MANUFACTURING COMPANY, A CORPORATION OF ILLINOIS.

MIXING VALVE.

Application filed July 3, 1922. Serial No. 572,470.

*To all whom it may concern:*

Be it known that I, WALTER F. HINKLE, a citizen of the United States, and a resident of the city of Chicago, in the county of Cook and State of Illinois, have invented certain new and useful Improvements in a Mixing Valve; and I do hereby declare that the following is a full, clear, and exact description of the same, reference being had to the accompanying drawings and to the numerals of reference marked thereon, which form a part of this specification.

This invention relates to a mixing valve for hot and cold water for bath tubs, shower baths and the like, adapted to supply a single stream of mixed hot and cold water in adjustable proportions or either hot or cold water separately. Devices for accomplishing such a mixture have been proposed heretofore, but they have been defective in that they commonly supply a stratified or unevenly mixed stream to the shower, resulting in hot and cold portions of the shower that make such a bath very uncomfortable.

It is an object of this invention to provide a concealed bath fixture having only one operating means for temperature control of the water supply and another operating means unaffected by the position of the first means but concentric therewith for regulating the rate of flow of the water supply.

It is another object of this invention to provide a means of directing a stream of water with any desired degree of temperature and under a controllable rate of flow from either a shower or a tub nozzle.

It is a further object of this invention to provide means for regulating the rate of flow of water, after securing the desired temperature, from the full capacity of the supply pipes down to complete shut off without in any way disturbing the temperature adjustment.

It is still a further object of this invention to provide a tamper-proof adjustment of the maximum rate of flow through a mixing valve without in any way affecting the regulation of the rate of flow up to this maximum.

It is an important object of this invention to provide a construction allowing removal and replacement of the operating parts of a mixing valve without necessitating shutting off the water pressure.

It is a further important object of this invention to provide a mixing valve requiring the minimum amount of labor and pipe fittings in its installation to reduce the cost thereof to a minimum.

It is a very important object of this invention to provide a simple easily manufactured valve that can be assembled in only one way and that will compare favorably as to manufacturing costs with any mixing valve in a similar class.

Other and further important objects of this invention will be apparent from the disclosures in the specification and the accompanying drawings.

The invention (in a preferred form) is illustrated in the drawings and hereinafter more fully described.

On the drawings:

Figure 1 is a plan view of a device embodying this invention.

Figure 2 is a sectional view on the center line in a plane parallel to that of Figure 1.

Figure 3 is a partial section at right angles to that of Figure 2.

Figure 4 is a section on the line 4—4 of Figure 3.

Figure 5 is an elevation of this device.

Figure 6 is a section on the line 6—6 of Figure 2.

Figure 7 is a section on the line 7—7 of Figure 2.

Figures 8 to 11 represent diagrammatic sections of the sleeve valve in different positions intended to show the progressive stages of mixing the hot and cold water supply.

In each figure the section marked "Inlet" corresponds in reversed position with Fig. 7, and that marked "Outlet" with Fig. 6.

As shown on the drawings:

The numeral 1 refers to a bathroom wall or bath tub through which the device of this invention is inserted in such a way that all piping therefor is concealed behind the wall or tub and only an operating handle is visible. The body 2 of the device of this invention is substantially a cylinder having a bore closed at one end 3. A portion 4 of the cylinder, intended to pass through walls of varying thickness, is externally threaded and provided with two flanged nuts 5 to engage with either side of the wall 1 to adjust the body 2 into proper position relative to the outside of the wall. Next to the closed end of the cylinder are ports 6 and 7 diametrically opposite each other and opening into the bosses 8 and 9 which are threaded to take outlet pipes leading to the shower and tub fixtures. Between the outlet ports and the straight part of the cylinder are located inlet ports 10 and 11, opposite each other and at right angles to the outlet ports, leading to inlet bosses 12 and 13 threaded for the hot and cold water supply pipes 14 and 15. As shown the bosses 8 and 9 are bent towards the wall and the bosses 12 and 13 away from the wall in order to bring all the connecting pipes into one plane to render the piping layout less complicated.

The two series of ports are controlled by a rotatable sleeve 16 within the cylinder 2. The sleeve has a single port 17 adapted to register with either the shower or tub outlet, as desired by the operator. The hot and cold water inlet ports 10 and 11 in the cylinder 2 are controlled by the ports 18 and 19 on one side of the sleeve 16 for the shower and the ports 20 and 21 on the opposite side of the sleeve for the tub. The sleeve 16 is therefore symmetrical about the diameter lying in the plane of Fig. 2.

Operating mechanism for rotating the sleeve 16 consists of a tubular shaft 22 having a handle 23 on the outer end thereof and secured thereto. The tubular shaft 22 is in turn secured to a dog 24 having unequal diametrically opposed lugs 25 and 26 seating in suitable slots in the edge of the sleeve 16.

The sleeve 16 is provided with a packing space 27 adapted to prevent leakage between the sleeve and the cylinder walls between the series of inlet and outlet ports, and is also provided with a spring retaining ring 28 adapted to prevent longitudinal displacement of the sleeve in the cylinder. Inside the sleeve and between the two series of ports therein is an apertured partition 29 on which seats a valve disc 30 adapted to regulate the rate of flow from the inlet portion of the sleeve to the outlet portion. This disc 30 is backed by a stiff plate 31 and mounted on an internally threaded member 32 of non-circular outer form adapted to slide in a corresponding recess 33 in the dog 24. The member 32 with the valve disc 30 is projected or retracted by a threaded member 34 secured to a shaft 35 extended through the tubular shaft 22 and adapted to be turned by a hand wheel 36 secured thereto adjacent the handle 23.

The tubular shaft 22 is reduced in its outer diameter to afford a shoulder 37 against which a cap 38 abuts to retain the shaft in place. The cap is threaded to engage over the cylinder 2 compressing the gasket 39 to seal the cylinder against leakage at this joint. The cap 38 is provided with the usual form of packing gland 40 and packing 41 bearing on the tubular shaft 22. The necessary packing for the inner shaft 35 is provided by a gland 49 in the outer end of the tubular shaft 22. The neck 42 of the cap 38 is externally threaded for an annular, shouldered nut 43 adapted to hold a finishing member 44 against the wall 1 to completely conceal the various joints and nuts. The top of this finishing member 44 is provided with suitable indicia for the position of the sleeve 16 by means of the mixing valve handle 23, which has a pointer 45 integral therewith. This finishing member can be clamped in any position desired.

The inner shaft 35 operating the disc 30 is enlarged to provide a shoulder 46 below the dog 24 to prevent its being pulled out, and the shoulder 37 on the tubular shaft prevents that from being pulled out. The valve disc 30 is secured to the member 32 by means of a screw 47 threaded through the center thereof with a lock nut 48 therein which bears against the lower end of the member 32, locking the screw 47 and allowing the disc 30 to swivel freely. The screw 47 serves as an adjustable stop limiting the opening of the disc 30 by striking the inner end of the shaft 35. The valve must be disassembled to change the adjustment of this screw which regulates the maximum flow of water through the partition 29 between the inlet and outlet ports. A stop for limiting the rotation of the sleeve 16 in either direction is provided by a boss 51 integral with the cylinder and projecting through an aperture 50 in the sleeve.

The operation is as follows:

The operation of this device is best described in connection with Figs. 8 to 11 which correspond with various positions of the operating handle 23. The diagrammatic section marked "Inlet" corresponds to a section through the sleeve 16 in line with the inlet ports, and the section marked "Outlet" discloses the corresponding movement of the portion of the sleeve controlling the outlet to the tub and shower. Fig. 8 shows the handle displaced about 18 degrees clockwise until on the inlet section the cold water supply port 11 is shown as about to be opened by the part 19 in the sleeve. The corresponding outlet section discloses that the shower port 6 has already been opened by the port 17 in the sleeve 16. Similarly Fig. 9 shows approximately 28 degrees turn of the handle with the cold supply ports wide open and the hot supply ports about to open, thus supplying only cold water. Fig. 10 discloses approximately a 55 degree turn with the cold water ports closing and the hot water ports opening to supply a mixed stream of warm water. Fig. 11 shows approximately 76 degrees opening with the hot inlet port wide open and the cold inlet just closing. It will be noted that the shower control has been open during the entire range from cold to hot water.

The water supply passes into the interior of the sleeve for mixing, and through the partition 29 and disc valve 30 to the outlet port of the sleeve controlling whether it is delivered to the shower or tub. It will be evident that thorough mixture is caused by the sleeve, partition, valve and outlet port so that the issuing water is at a uniform temperature.

The rate of flow through the mixing valve is controlled entirely independently of the handle 23 by means of the operating hand wheel 36 which regulates the position of the disc valve 30 with respect to its seat in the partition. All the operating parts of the flow regulating valve 30 turn with the handle 23 without changing the position of the valve 30 with respect to the partition.

With full water pressure on the inlets it is possible to remove all the operating parts, except the sleeve, with the cap 38 for repacking or adjustment of the screw 47 without leakage because the sleeve seals all the ports when rotated into its closed position. The advantages of such a construction are self-evident. The arrangement of the sleeve provides three sealed joints at least two of which must leak before leakage can occur at the tub or shower outlets, one of these joints being an adjustable positively seated valve.

The handle 23 can be assembled and the finishing member 44 turned before clamping until the indicia thereon agrees with the pointer 45 on the handle; thus permitting assembly of the valve in any desired position with the handle arranged as most convenient.

I am aware that numerous details of construction may be varied through a wide range without departing from the principles of this invention, and I therefore do not purpose limiting the patent granted otherwise than necessitated by the prior art.

I claim as my invention:

1. In a mixing valve, a body having a cylindrical bore with hot and cold water supply pipes connected therewith in one plane, and tub and shower outlet pipes connected therewith in a separate plane, a rotatable sleeve having ports therein adapted to register with any combination of the said inlet and outlet connections as desired, and a closure for said bore removable without disturbing said sleeve.

2. In a mixing valve, a body having a passage with hot and cold water supply pipes connected removable therewith in one plane, and tub and shower outlet pipes connected therewith in a separate plane, a rotatable sleeve having ports therein adapted to register with any combination of the said inlet and outlet connections as desired, and a valve within said sleeve between said inlet and outlet ports.

3. In a mixing valve, a body with hot and cold water supply pipes connected therewith in one plane, and tub and shower outlet pipes connected therewith in a separate plane, a rotatable sleeve therein having ports adapted to register with any combination of the said inlet and outlet connections as desired, a separably removable valve stem for said sleeve, and an operating handle for said sleeve.

4. In a mixing valve, a recessed body with hot and cold water supply pipes connected therewith in one plane, and tub and shower outlet pipes connected therewith in a separate plane, a rotatable sleeve therein having ports adapted to register with any combination of the said inlet and outlet connections as desired, a valve within said sleeve between said inlet and outlet ports, and an operating handle and closure removable without disturbing said sleeve.

5. In a mixing valve, a body having a cylindrical bore with hot and cold water supply pipes connected therewith in one plane, and tub and shower outlet pipes connected therewith in a separate plane, a rotatable sleeve having ports therein adapted to register with any combination of the said inlet and outlet connections as desired, an operating handle and a stem removable without disturbing said sleeve, and means secured to said body carrying indicia for the mixture the said sleeve delivers.

6. In a mixing valve, a body having a chamber therein with hot and cold water supply pipes connected therewith in one plane, and tub and shower outlet pipes connected therewith in a separate plane, a rotatable sleeve therein having ports adapted to register with any combination of the said inlet and outlet connections as desired, a valve within said sleeve between said inlet and outlet ports, an operating handle for said sleeve, and a hand wheel for said valve.

7. In a mixing valve, a body having a cylindrical bore with hot and cold water supply pipes connected therewith in one plane, and tub and shower outlet pipes connected therewith in a separate plane, a closure for said bore, a rotatable sleeve having ports therein adapted to register with any combination of the said inlet and outlet connections as desired, and means for retaining said sleeve in said body when said closure is removed.

8. In a mixing valve, a body having a chamber therein with hot and cold water supply pipes connected therewith in one plane, and tub and shower outlet pipes connected therewith in a separate plane, a rotatable sleeve having ports therein adapted to register with any combination of the said inlet and outlet connections as desired, a 9. In a plumbing fixture of the class described, a body of substantially cylindrical form having hot and cold water supply ports therein in one plane and tub and shower outlet ports therein in another plane, and a non-removable piston in said body capable of limited rotation and having ports adapted to selectively register with the various inlet and outlet ports in the body.

10. In a plumbing fixture of the class described, a chambered body having hot and cold water supply ports therein in one plane and tub and shower outlet ports therein in another plane, a piston in said body capable of limited rotation and having ports adapted to selectively register with the various inlet and outlet ports in the body, means for permanently retaining said piston in place and a valve within said piston between said inlet and outlet ports.

11. In a plumbing fixture of the class described, a body of substantially cylindrical form having hot and cold water supply ports therein in one plane and tub and shower outlet ports therein in another plane, a piston permanently secured in said body capable of limited rotation and having ports adapted to selectively register with the various inlet and outlet ports in the body, and an operating handle for said piston.

12. In a plumbing fixture of the class described, a passaged body having hot and cold water supply ports therein in one plane and tub and shower outlet ports therein in another plane, a piston permanently retained in said body capable of limited rotation and having ports adapted to selectively register with the various inlet and outlet ports in the body, a valve within said piston between said inlet and outlet ports, and an operating handle for said piston.

13. In a plumbing fixture of the class described, a body of substantially cylindrical form having hot and cold water supply ports therein in one plane and tub and shower outlet ports therein in another plane, a piston in said body capable of limited rotation and having ports adapted to selectively register with the various inlet and outlet ports in the body, means for permanently retaining said piston in position, and means secured to said body carrying indicia for the mixture the said piston delivers.

14. In a plumbing fixture of the class described, a chambered body having hot and cold water supply ports therein in one plane and tub and shower outlet ports therein in another plane, a piston in said body capable of limited rotation and having ports adapted to selectively register with the various inlet and outlet ports in the body, a valve within said piston between said inlet and outlet ports, and a hand wheel for said valve.

15. In a plumbing fixture of the class described, a body of substantially cylindrical form having hot and cold water supply ports therein in one plane and tub and shower outlet ports therein in another plane, a piston in said body capable of limited rotation and having ports adapted to selectively register with the various inlet and outlet ports in the body, and means for permanently retaining said piston in said body.

16. In a plumbing fixture of the class described, a body of substantially cylindrical form having hot and cold water supply ports therein in one plane and tub and shower outlet ports therein in another plane, a piston in said body capable of limited rotation and having ports adapted to selectively register with the various inlet and outlet ports in the body, a valve within said piston between said inlet and outlet ports, and an adjustable stop for said valve limiting the maximum opening thereof.

17. In a plumbing fixture, means for mixing hot and cold water, means concentric with said first mentioned means adapted to regulate the rate of flow of said water independent of said mixing means, and adjustable means limiting the maximum rate of flow of said water.

18. In a hot and cold water mixing valve, means for regulating the temperature of the discharge water, means integral therewith for determining whether the discharge shall be into a tub or through a shower, and means concentric therewith adapted to regulate the rate of flow of said water independent of said mixing means.

19. In a hot and cold water mixing valve, means for regulating the temperature of the discharge water, means integral therewith for determining whether the discharge shall be into a tub or through a shower, means concentric therewith adapted to regulate the rate of flow of said water independent of said mixing means, and adjustable means limiting the maximum rate of flow of said water.

In testimony whereof I have hereunto subscribed my name in the presence of two subscribing witnesses.

WALTER F. HINKLE.

Witnesses:
CARLTON HILL,
OSCAR HARTMANN.